US012633236B2

(12) United States Patent
Huang et al.

(10) Patent No.: US 12,633,236 B2
(45) Date of Patent: May 19, 2026

(54) DISPLAY DEVICE HAVING FLEXIBLE DISPLAY SCREEN AND ELECTRONIC EQUIPMENT

(71) Applicant: Shenzhen China Star Optoelectronics Semiconductor Display Technology Co., Ltd., Shenzhen (CN)

(72) Inventors: Yichun Huang, Shenzhen (CN); Xiaohong Jing, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 110 days.

(21) Appl. No.: 18/401,521

(22) Filed: Dec. 31, 2023

(65) Prior Publication Data

US 2025/0218314 A1 Jul. 3, 2025

(30) Foreign Application Priority Data

Sep. 22, 2023 (CN) ......................... 202311237332.7

(51) Int. Cl.
*G09F 9/00* (2006.01)
*G06G 1/16* (2006.01)
*G09F 9/30* (2006.01)

(52) U.S. Cl.
CPC .................................... *G09F 9/301* (2013.01)

(58) Field of Classification Search
CPC ................................. G09F 9/301; G09F 9/335
See application file for complete search history.

(56) References Cited

U.S. PATENT DOCUMENTS 9,743,542 B2 * 8/2017 Heo ....................... G06F 1/1652
10,410,549 B1 * 9/2019 Kim ....................... G06F 1/1652
10,506,726 B2 * 12/2019 Kang ................... H10K 77/111
10,534,402 B1 * 1/2020 Kim ....................... G06F 1/1652
10,588,223 B2 * 3/2020 Han ........................ H05K 1/028
10,748,456 B2 * 8/2020 Pyo ...................... G09F 15/0062
(Continued)

FOREIGN PATENT DOCUMENTS

CN 110751907 A 2/2020
CN 212317732 U 1/2021
(Continued)

OTHER PUBLICATIONS

Chinese Office Action issued in corresponding Chinese Patent Application No. 202311237332.7 dated Jan. 19, 2026, pp. 1-9.

*Primary Examiner* — Rockshana D Chowdhury
(74) *Attorney, Agent, or Firm* — PV IP PC; Peter Stecher; Wei Te Chung

(57) ABSTRACT

A display device includes a casing, a flexible display screen, a storage component, and a lifting component. The lifting component includes a chain module, one or more connecting rods, and a screen supporting plate. The chain module is connected to the screen supporting plate, the screen supporting plate is connected to the connecting rod and another end of the flexible display screen. The chain module is connected to the screen supporting plate and configured to drive the screen supporting plate to lift and lower, so that the screen supporting plate drives the flexible display screen and the connecting rod to lift and lower.

20 Claims, 4 Drawing Sheets

(56) References Cited

U.S. PATENT DOCUMENTS

| | | | | |
|---|---|---|---|---|
| 10,777,102 | B2 * | 9/2020 | Cho | H05K 5/0217 |
| 10,890,947 | B2 * | 1/2021 | Choi | G09F 9/301 |
| 11,013,130 | B2 * | 5/2021 | Shin | G02F 1/133305 |
| 11,037,472 | B2 * | 6/2021 | Park | G09G 3/3233 |
| 11,057,707 | B2 * | 7/2021 | Kim | H04R 9/045 |
| 11,064,300 | B2 * | 7/2021 | Kim | H04R 17/00 |
| 11,127,320 | B2 * | 9/2021 | Park | G06F 1/1601 |
| 11,553,610 | B2 * | 1/2023 | Lee | G06F 1/1652 |
| 11,589,486 | B2 * | 2/2023 | Yoon | H05K 9/0054 |
| 11,632,866 | B2 * | 4/2023 | Pyo | G06F 1/1652<br>361/807 |
| 11,678,446 | B2 * | 6/2023 | Song | H05K 5/0217<br>361/688 |
| 11,699,366 | B2 * | 7/2023 | Song | G06F 1/1652<br>361/679.01 |
| 11,706,885 | B2 * | 7/2023 | Kim | H05K 5/0217<br>361/807 |
| 11,755,066 | B2 * | 9/2023 | Chang | G09F 9/301<br>361/679.01 |
| 11,812,565 | B2 * | 11/2023 | Seki | H05K 5/0217 |
| 11,839,039 | B2 * | 12/2023 | Han | G09F 9/335 |
| 11,869,391 | B2 * | 1/2024 | Lee | G09F 9/301 |
| 11,907,015 | B2 * | 2/2024 | Song | G09F 9/301 |
| 11,984,051 | B2 * | 5/2024 | Park | G02F 1/133314 |
| 11,994,913 | B2 * | 5/2024 | Jin | G06F 1/1601 |
| 12,160,963 | B2 * | 12/2024 | Pyo | H05K 5/0217 |
| 12,216,501 | B2 * | 2/2025 | Wang | G06F 1/1675 |
| 12,249,259 | B2 * | 3/2025 | Kim | G09F 9/301 |
| 12,382,593 | B2 * | 8/2025 | Park | G06F 1/1652 |
| 2011/0302843 | A1 | 12/2011 | Dallmann | |
| 2017/0156225 | A1 * | 6/2017 | Heo | G09F 9/301 |
| 2019/0198783 | A1 * | 6/2019 | Kim | H10H 20/855 |
| 2019/0278335 | A1 * | 9/2019 | Yeh | G06F 1/1601 |
| 2020/0013317 | A1 * | 1/2020 | Cho | H05K 5/0217 |
| 2020/0035133 | A1 * | 1/2020 | Pyo | F16M 13/02 |
| 2020/0160760 | A1 * | 5/2020 | Park | G06F 1/1652 |
| 2020/0201394 | A1 * | 6/2020 | Choi | G09F 9/301 |
| 2020/0394942 | A1 * | 12/2020 | Kim | G06F 1/1652 |
| 2021/0045258 | A1 * | 2/2021 | Lee | G06F 1/1601 |
| 2021/0127512 | A1 * | 4/2021 | Lee | G06F 1/1652 |
| 2022/0015249 | A1 * | 1/2022 | Kim | H02K 7/116 |
| 2022/0068170 | A1 * | 3/2022 | Han | G06F 1/1652 |
| 2022/0104373 | A1 * | 3/2022 | Zhang | G06F 1/1681 |
| 2022/0206536 | A1 * | 6/2022 | Chung | G06F 1/1675 |
| 2022/0210934 | A1 * | 6/2022 | Lee | H05K 5/0217 |
| 2023/0007950 | A1 * | 1/2023 | Chang | G09F 9/301 |
| 2023/0142005 | A1 * | 5/2023 | Wang | G09F 9/301<br>361/679.27 |
| 2023/0164936 | A1 * | 5/2023 | Kang | H05K 5/0217<br>361/807 |
| 2023/0225063 | A1 * | 7/2023 | Wang | H05K 5/0217<br>361/807 |
| 2023/0337378 | A1 * | 10/2023 | Pyo | G09F 9/301 |
| 2024/0218956 | A1 * | 7/2024 | Park | F16G 13/20 |
| 2025/0218314 | A1 * | 7/2025 | Huang | G09F 9/301 |

FOREIGN PATENT DOCUMENTS

| | | | |
|---|---|---|---|
| CN | 113241008 | A | 8/2021 |
| CN | 113781905 | A | 12/2021 |
| CN | 115807807 | A | 3/2023 |
| CN | 116084460 | A | 5/2023 |
| CN | 116290114 | A | 6/2023 |

* cited by examiner

DISPLAY DEVICE HAVING FLEXIBLE DISPLAY SCREEN AND ELECTRONIC EQUIPMENT

CROSS-REFERENCE TO RELATED APPLICATION

This application claims priority to and the benefit of Chinese Patent Application No. 202311237332.7, filed on Sep. 22, 2023, the disclosure of which is incorporated herein by reference in its entirety.

TECHNICAL FIELD

The present disclosure relates to display technologies, and in particular, to a display device and an electronic equipment.

BACKGROUND

With the development of organic light-emitting diode (OLED) display technology, flexible OLED technology is gradually becoming mature. Curled OLED display modules, as a new type of display technology module, will be a direction of innovative development for global panel and module manufacturers in the future. The existing curly OLED display modules, in order to achieve screen lifting and lowering, are driven by a plurality of motors disposed inside a casing, resulting in a more complex structure of the curled OLED display modules. Furthermore, due to a larger size of the casing, the curled OLED display modules after being stored have larger sizes and are inconvenient to carry.

Therefore, the existing curled OLED display modules require the plurality of motors to lift and lower the screens, resulting in technical problems, such as complex structures and larger sizes.

SUMMARY

Embodiments of the present disclosure provide a display device and an electronic equipment, so as to alleviate a technical problem that existing curled OLED display modules require a plurality of motors to lift and lower screens, resulting in complex structures and larger sizes.

An embodiment of the present disclosure provides a display device including a casing, a flexible display screen capable of scrolling inside the casing, a storage component, and a lifting component. The storage component is disposed inside the casing and connected to an end of the flexible display screen for rewinding the flexible display screen. The lifting component is connected to another end of the flexible display screen for lifting and lowering the flexible display screen. The lifting component includes one or more connecting rods, a screen supporting plate, and a chain module. The screen supporting plate is connected to the connecting rods and another end of the flexible display screen. The chain module is connected to the screen supporting plate and configured to drive the screen supporting plate to lift and lower, so that the screen supporting plate drives the flexible display screen and the connecting rod to lift and lower.

An embodiment of the present disclosure provides an electronic equipment including the display device mentioned above.

Beneficial effects: The present disclosure provides the display device and the electronic equipment. The display device includes the casing, the flexible display screen, the storage component, and the lifting component. The flexible display screen is capable of scrolling inside the casing. The storage component is disposed inside the casing and connected to the end of the flexible display screen for rewinding the flexible display screen. The lifting component is connected to another end of the flexible display screen for lifting and lowering the flexible display screen. The lifting component includes the chain module, one or more connecting rod, and the screen supporting plate. The chain module is connected to the screen supporting plate, the screen supporting plate is connected to the connecting rod and connected to another end of the flexible display screen. The chain module is used to drive the screen supporting plate to lift and lower, so that the screen supporting plate drives the flexible display screen and the connecting rod to lift and lower. In the present disclosure, the lifting component includes the chain module, the connecting rod, and the screen supporting plate, the flexible display screen is connected between the storage component and the screen supporting plate, and the chain module is connected to the screen supporting plate, so that the chain module may drive the screen supporting plate to lift and lower, thereby driving the flexible display screen to lift and lower without disposing the plurality of motors, reducing complexity and size of the display device, realizing a smaller curling radius, and increasing an application range of the display device. Furthermore, the screen supporting plate drives the connecting rod to lift and lower to prevent the flexible display screen from shifting during a lifting process of the flexible display screen. The connecting rod supports the screen supporting plate to support the flexible display screen, so as to prevent the flexible display screen from bending.

BRIEF DESCRIPTION OF THE DRAWINGS

The technical solutions, as well as other beneficial advantages, of the present disclosure will be apparent from the following detailed descriptions of embodiments of the present disclosure, with reference to the attached drawings.

DETAILED DESCRIPTION

Figure 1:
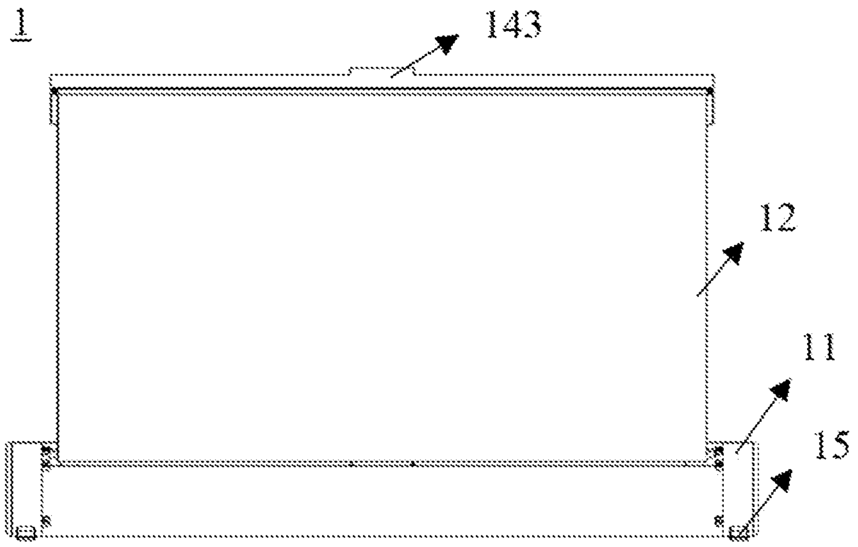
FIG. 1 is a front view of a display device provided by an embodiment of the present disclosure.

The technical solutions in embodiments of the present disclosure will be described clearly and completely hereafter with reference to the accompanying drawings. Apparently, described embodiments are only a part of but not all embodiments of the present disclosure. All other embodiments obtained by persons of ordinary skill in the art based on the embodiments of the present disclosure without creative efforts shall fall within a protection scope of the present disclosure.

In the description of this embodiment, terms indicating orientation or location relationships such as “center”, “vertical”, “horizontal”, “length”, “width”, “thickness”, “upper”, “up”, “down”, “rear”, “front”, “left”, “right”, “vertical”, “horizontal”, “top”, “bottom”, “inner”, “outer”, “clockwise”, and “counterclockwise” are based on orientation or location relationships shown in drawings, which are only for a convenience of description and simplified operation, rather than indicating or implying that devices or elements referred to must have a specific orientation, be constructed and operated in a specific orientation, so it cannot be understood as a limitation of the present disclosure. In addition, terms "first" and "second" are used herein for purposes of description, and should not be interpreted as indication or implication of relative importance, or implied indication of a number of the technical features. Therefore, features limited by terms such as "first" and "second" can explicitly or impliedly include one or more than one of these features. In description of the disclosure, "a plurality of" means two or more than two, unless otherwise specified.

In description of the present disclosure, it should be noted that unless otherwise specified and defined, terms "connected" and "fixed" should be understood in a broad sense, for example, it may be a fixed connection, a detachable connection, or a whole; it may be a mechanical connection or an electrical connection; it may be a directly connection or an indirectly connection through an intermediate media; and it may be an internal connection of two components or an interaction relationship between two components. For those skilled in the art, meanings of the above terms in the present disclosure can be understood according to situations.

In the present disclosure, unless otherwise specified and defined, a first feature is disposed "on" or "under" a second feature may include a direct contact between the first feature and the second feature, or a contact between the first feature and the second feature through other features rather than the direct contact. Moreover, that the first feature is disposed "above" or "up" the second feature includes that the first feature is directly above or obliquely above the second feature, or only indicates that a horizontal height of the first feature is greater than a horizontal height of the second feature. That the first feature is disposed "below", "under", or "underneath" of the second feature includes that the first feature is directly below or obliquely below the second feature, or only indicates that the horizontal height of the first feature is less than the horizontal height of the second feature.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied.

Figure 2:
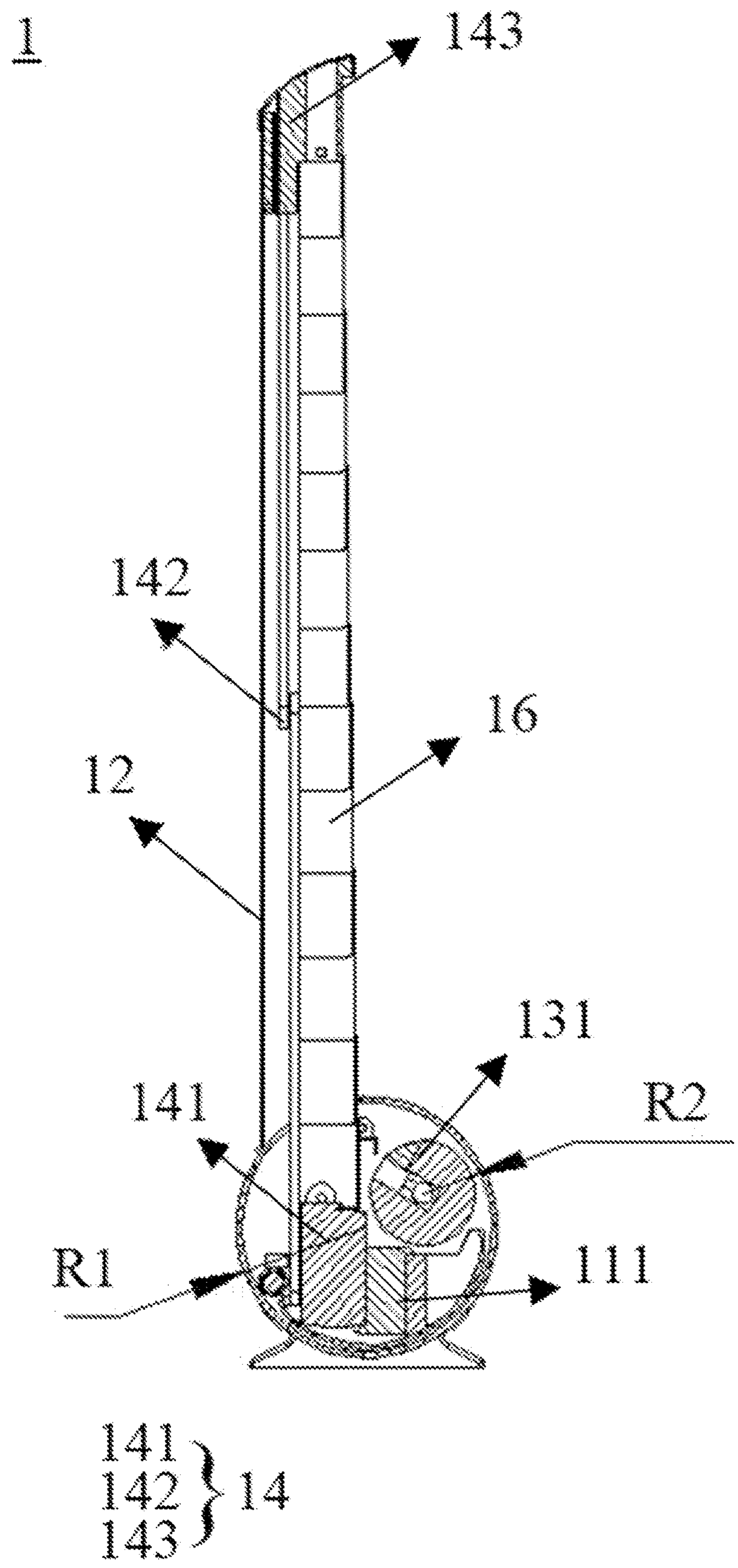
FIG. 2 is a side view of the display device provided by an embodiment of the present disclosure.
Figure 3:
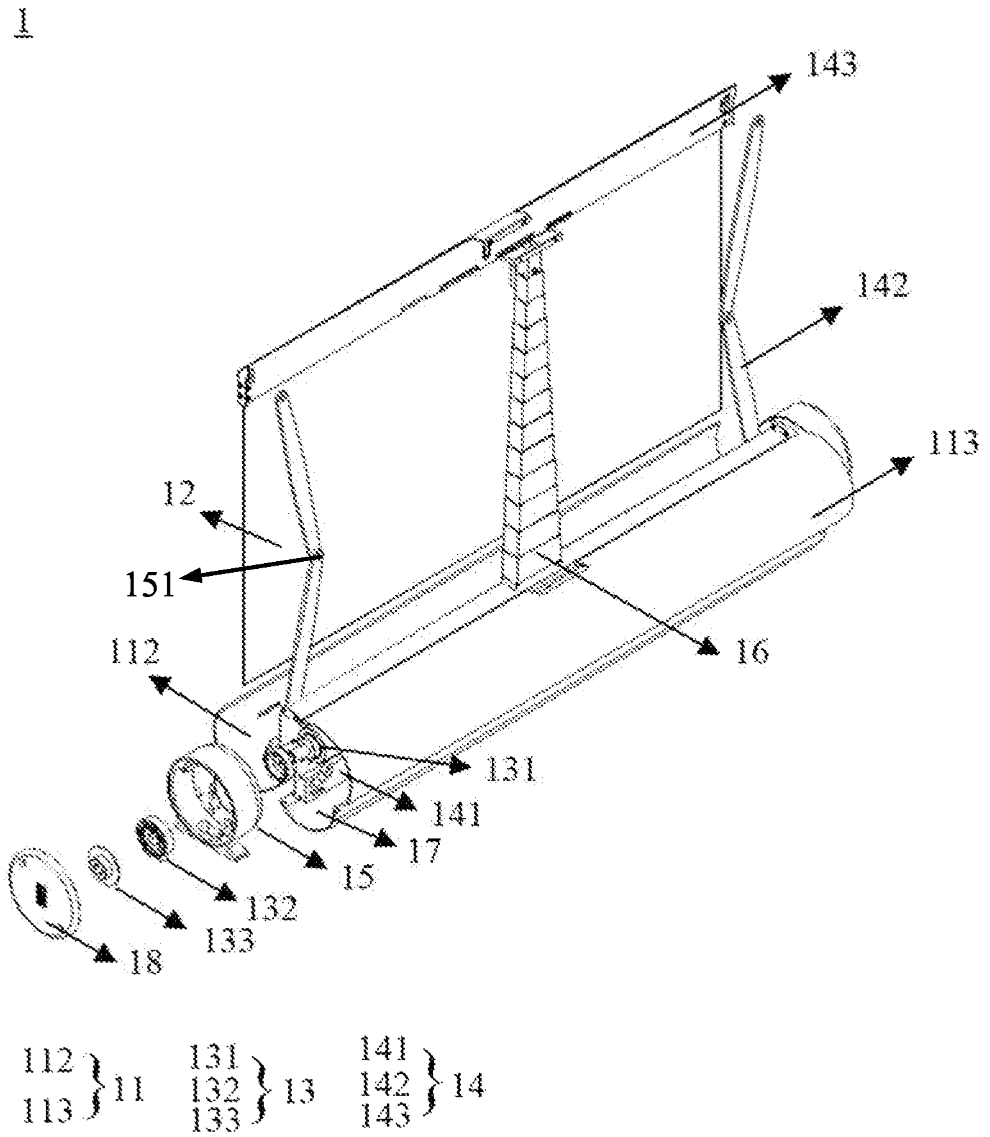
FIG. 3 is an explosion view of the display device provided by an embodiment of the present disclosure.
Figure 4:
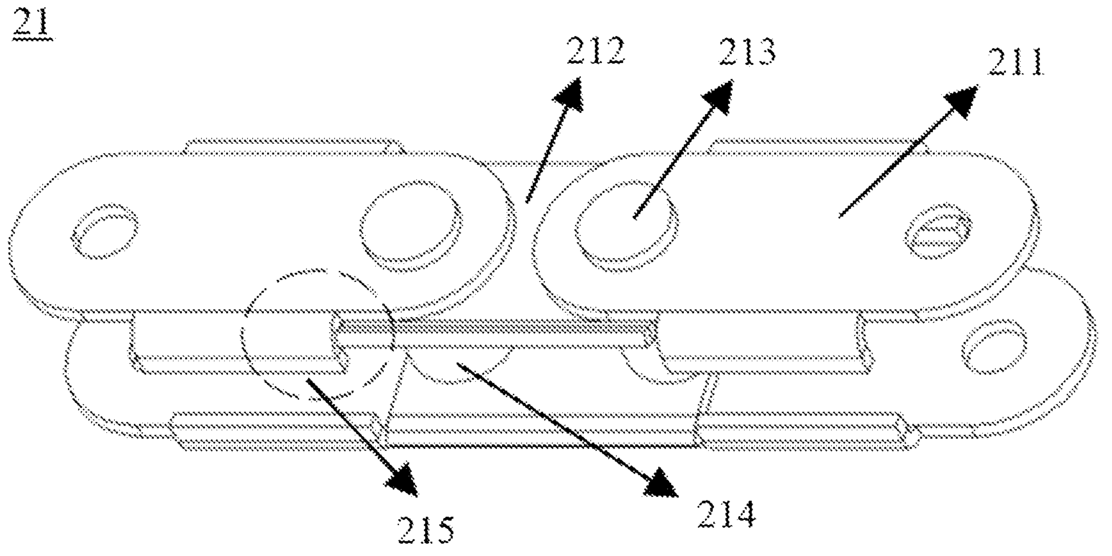
FIG. 4 is a schematic structural view of a chain provided by an embodiment of the present disclosure.

FIG. 1 is a front view of a display device provided by an embodiment of the present disclosure. FIG. 2 is a side view of the display device provided by an embodiment of the present disclosure. FIG. 3 is an explosion view of the display device provided by an embodiment of the present disclosure. FIG. 4 is a schematic structural view of a chain provided by an embodiment of the present disclosure.

Referring to FIGS. 1 to 3, an embodiment of the present disclosure provides a display device including a casing 11, a flexible display screen 12, a storage component 13, and a lifting component 13.

The flexible display screen 12 is capable of scrolling inside the casing 11. The storage component 13 is disposed inside the casing 11 and connected to an end of the flexible display screen 12 for rewinding the flexible display screen

12. The lifting component 13 is connected to another end of the flexible display screen 12 for lifting and lowering the flexible display screen 12.

The lifting component includes 14 a chain module 141, one or more connecting rod 142, and a screen supporting plate 143. The chain module 141 is connected to the screen supporting plate 143, the screen supporting plate 143 is connected to the connecting rod 142, and the screen supporting plate 143 is connected to another end of the flexible display screen 12. The chain module 141 is used to drive the screen supporting plate 143 to lift and lower, so that the screen supporting plate drives the flexible display screen 12 and the connecting rod 142 to lift and lower.

The present disclosure provides a display device. The lifting component includes the chain module, one or more connecting rods, and the screen supporting plate. The flexible display screen is connected between the storage component and the screen supporting plate. The chain module is connected to the screen supporting plate, so that the chain module may drive the screen supporting plate to lift and lower, thereby driving the flexible display screen to lift and lower without disposing a plurality of motors, reducing complexity and size of the display device, realizing a smaller curling radius, and increasing an application range of the display device. Furthermore, the screen supporting plate drives the connecting rod to lift and lower to prevent the flexible display screen from shifting during a lifting process of the flexible display screen. The connecting rod supports the screen supporting plate to support the flexible display screen, so as to prevent the flexible display screen from bending.

Specifically, the flexible display screen may be capable of scrolling inside the casing. The flexible display screen may be unfolded and curled. As shown in FIG. 3, when the flexible display screen is unfolded, the flexible display screen is in a flat state. When the flexible display screen is curled, the flexible display screen is curled on a rotating shaft 131.

Specifically, as shown in FIGS. 1 to 3, when the flexible display screen is stored, the flexible display screen may be curled on the rotating shaft. The casing is transparent, so that the flexible display screen may realize display after being curled. When the flexible display screen is unfolded, the flexible display screen may be rotated along the rotating shaft to realize lifting and lowering, so that a lifting height and display pictures of the flexible display screen may be determined according to usage scenarios, thereby realizing the display after being unfolded.

Specifically, in this embodiment of the present disclosure, the flexible display screen may realize lifting and lowering through the chain module, the connecting rod, and the screen supporting plate. The chain module may be stored, the connecting rod may be folded, and an occupied space of the screen supporting plate is smaller. Curling transmission components are reduced, and the display device does not need a plurality of motors for driving, so that an overall size of the display device is smaller. After the flexible display screen is stored, the size of the display device is smaller, so that the occupied space of the display device is smaller, and the display device is convenient to carry. Since the size of each structure of the display device is smaller, a curling radius of the display device may be correspondingly reduced.

Specifically, the connecting rods may be disposed at both sides of the casing, and the connecting rods located at both sides of the casing are symmetrically disposed. The connecting rods are disposed at both left and right sides to support the screen supporting plate, so as to prevent the flexible display screen from falling.

Specifically, each of the connecting rods may include a plurality of parts. For example, each of the connecting rods 142 shown in FIG. 2 and FIG. 3 includes upper and lower parts. When the flexible display screen is lifted and lowered, the screen supporting plate is lifted and lowered to drive the connecting rods to fold and rotate, so that the screen supporting plate may be fixed and supported by the connecting rods, thereby preventing the screen supporting plate from shifting and falling.

Specifically, the screen supporting plate may be fixedly connected to the flexible display screen. The screen supporting plate may be driven to lift and lower by lifting and lowering the screen supporting plate, and the screen supporting plate may support the flexible display screen, thereby preventing the flexible display screen from folding and bending, resulting in a poor display effect of the flexible display screen.

Specifically, a width of the screen supporting plate may be equal to a width of the flexible display screen, so that a contact area between the screen supporting plate and the flexible display screen is larger, the screen supporting plate has a better supporting effect on the flexible display screen, and the screen supporting plate has a better lifting and lowering effect on the flexible display screen.

In some embodiments, as shown in FIGS. 1 to 3, the storage component 13 includes a rotating shaft 131 fixed on the rotating shaft 131 and a coil spring 132 connected to an end of the flexible display screen 12. By fixing the coil spring on the rotating shaft, a relative position of a coil sheet of the coil spring may be adjusted through a rotation of the rotating shaft, so that a change of the spring pre-tightening force may be realized, the flexible display screen fixed on the rotating shaft may be stored or unfolded under control of the spring pre-tightening force of the coil spring and the lifting component, thereby realizing the lifting and lowering of the flexible display screen.

Specifically, since the coil spring is disposed on the rotating shaft, when the flexible display screen needs to be lifted, the flexible display screen is lifted by the lifting component, so that the coil spring is in a stretching state and the pre-tightening force of the spring is increased. When the flexible display screen needs to be stored, the flexible display screen may be stored by the lifting module, and the coil spring is in a contracting state and the pre-tightening force of the spring is reduced, so that the flexible display screen is rewound on the rotating shaft, thereby realizing the lifting and lowering of the flexible display screen.

Specifically, as shown in FIG. 2, a radius R2 of the rotating shaft 131 ranges from 20 mm to 100 mm.

In some embodiments, as shown in FIG. 3, the storage component 13 further includes an adjusting member 133 connected to the coil spring 132 for adjusting an initial pre-tightening force of the coil spring 132. By disposing the adjusting member, the initial pre-tightening force of the coil spring may be adjusted, so that when the initial pre-tightening force of the coil spring is too large, the initial pre-tightening force of the coil spring is reduced to avoid high energy consumption of the lifting component. When the initial pre-tightening force of the coil spring is too small, the initial pre-tightening force of the coil spring is increased, so that the flexible display screen may not be rewound on the rotating shaft to prevent the flexible display screen from being damaged.

Specifically, when the flexible display screen is rewound on the rotating shaft, and the initial pre-tightening force of the coil spring is smaller, the flexible display screen may not be well rewound on the rotating shaft, resulting in a problem that the flexible display screen contacts with other structures and may damage the flexible display screen. Then, the initial pre-tightening force of the coil spring may be adjusted by the adjusting member, so that the coil spring may shrink to tighten the flexible display screen. When the initial pre-tightening force of the coil spring is larger, the flexible display screen is rewound on the rotating shaft. When the flexible display screen needs to be lifted and lowered, the lifting component needs to provide a larger lifting force, resulting in higher energy consumption of the lifting component. Then, the initial pre-tightening force of the coil spring may be adjusted, so that the energy consumption of the lifting component is reduced, thereby reducing the energy consumption of the display device.

Specifically, the adjusting member may be fixed on the bracket with an end of the coil spring.

In some embodiments, as shown in FIGS. 1 to 3, the display device 1 further includes a bracket 15 and a bearing 151. The casing 11 is fixed on the bracket 15, and the connecting rod 142 is connected to the bearing 151 through the bearing 151. By disposing the bracket 15 and the bearing 151, and the bearing 151 is connected to the connecting rod 142, the rotating shaft may be rotated along the bearing 151, and the casing 11 may be fixed on the bracket 15, thereby preventing the flexible display screen from being damaged or the casing is shifted due to vibration when lifting and lowering the flexible display screen.

Specifically, FIG. 3 shows the bearings at a joint of two parts of the connecting rod 142. It is understood that the connecting rod 142 is connected to the casing 11, and a joint of the connecting rod 142 and the casing 11 is further provided with the bearing, and a joint of the connecting rod 142 and the screen supporting plate 143 is further provided with the bearing.

Specifically, when the connecting rod 142 is stored, the connecting rod 142 may be disposed transversely in a direction from one side of the bracket to another side of the bracket, so as to reduce the occupied space.

Specifically, the brackets 15 may be disposed at both sides of the casing. Further, the brackets 15 disposed at both sides of the casing are symmetrically disposed.

Specifically, as shown in FIG. 3, the casing 11 includes a front outer casing 112 and a back outer casing 113. Both the front outer casing 112 and the back outer casing 113 are fixed on the bracket 15, so as to prevent the casing from shifting caused by vibrations of the lifting component, resulting in damaging to the flexible display screen.

Specifically, as shown in FIG. 2, the casing 11 further includes an outer casing reinforcement 111 to prevent the casing 11 from separating, which results in a shifting or exposure of other components, thereby preventing the other components from being damaged.

Specifically, as shown in FIG. 2, a radius R1 of the casing 11 ranges from 50 mm to 200 mm.

In some embodiments, as shown in FIGS. 1 to 4, the chain module 141 includes a driving motor (not shown in the figures) and a chain 21. The chain 21 is connected between the driving motor and the screen supporting plate 143. By using the driving motor to drive the chain, the chain may be driven upward according to a certain track to drive the screen supporting plate to move, the screen supporting plate may drive the flexible display screen and the connecting rod to move, thereby realizing the lifting and lowering of the flexible display screen without disposing a plurality of driving mechanisms and transmission mechanisms to drive, reducing the complexity and size of the display device, realizing a smaller curling radius, increasing the application range of the display device. Furthermore, the connecting rod may prevent the flexible display screen from shifting during the lifting process of the flexible display screen, and the connecting rod may support the screen supporting plate to support the flexible display screen, so as to prevent the flexible display screen from bending.

Specifically, the driving motor includes a deceleration motor.

Specifically, when the flexible display screen needs to be lifted and lowered, the chain may be driven to move by the driving motor. When the chain is installed, the chain may be limited to move in the certain track, such as moving in a vertical direction outside the casing, so as to drive the screen supporting plate to move, and the screen supporting plate drives the flexible display screen to move, thereby preventing the flexible display screen from wrinkling or bending, caused by an uncertain moving direction of the chain.

Specifically, the embodiment of the present disclosure merely needs one driving motor to drive the flexible display screen to move the transmission of the chain, the connecting rod, and the screen supporting plate, without disposing the plurality of driving mechanisms and transmission mechanisms, thereby reducing the complexity and size of the display device, realizing smaller curling radius, and increasing the application range of the display device. Furthermore, the screen supporting plate may support the flexible display screen to prevent the flexible display screen from bending.

In some embodiments, as shown in FIG. 4, the chain 21 includes an outer chain plate 211, an inner chain plate 212, a pin shaft 213, and a roller 214. The outer chain plate 211 is fixed with the inner chain plate 212 through the pin shaft 213 at a side of the inner chain plate 212, and the outer chain plate 211 is fixed with the inner chain plate 212 through the roller 214 at another side of the inner chain plate 212. Opposite sides of the outer chain plate 211 and the inner chain plate 212 are both provided with a bending part 215, and a bending direction of the bending part 215 of the outer chain plate 211 is opposite to a bending direction of the bending part 215 of the inner chain plate 212. The chain includes the outer chain plate, the inner chain plate, the pin shaft, and the roller, the outer chain plate and the inner chain plate on both sides are respectively fixed through the pin shaft and the roller, and both the outer chain plate and the inner chain plate are provided with the bending part, so that when the chain is lifted, the bending parts of the outer chain plate and the inner chain plate contact each other to ensure that the chain is straight, thereby driving the flexible display screen to lift and lower. When the chain needs to be rolled up, a side of the chain without the bending part of the inner chain plate may be folded and rolled into the casing to prevent the chain from occupying too much space.

Specifically, as shown in FIG. 4, one side of the inner chain plate 212 is provided with the bending part 215, and another side of the inner chain plate 212 is not provided with the bending part. When the connecting rod needs to be lifted by the chain, the bending part 215 of the inner chain plate 212 may be contacted with the bending part 215 of the outer chain plate 211, so that the inner chain plate 212 and the outer chain plate 211 may be blocked, and the chain may be straightened to lift the flexible display screen. When the chain needs to be rolled up, the chain may be folded from the side of the inner chain plate 212 where the bending part is not provided, so that the chain may be rolled up to prevent the chain module from occupying too much space.

Regarding the high vibration during the chain transmission process, there may be problems such as chain displacement, in some embodiments, as shown in FIG. 2 and FIG. 3, the display device 1 further includes a chain back cover 16 disposed in a lifting area of the chain. The chain back cover 16 is telescoped movable. By disposing the chain back cover, the chain is limited in the chain back cover during the transmission process, so as to avoid damage to the flexible display screen caused by displacement during the transmission process of the chain, and prevent displacement or damage to other components caused by vibration during during the transmission process of the chain.

Specifically, the chain back cover 16 may be telescoped movable, and the chain back cover includes a plurality of foldable parts, so that the chain back cover may be stored and unfolded through the lifting and lowering of the plurality of foldable parts in the lifting process of the chain, so that the chain may be limited and protected when the chain is lifted and lowered, and the chain back cover may further be folded and stored when the chain is stored, thereby prevent the chain back cover from occupying excessive space.

Specifically, when the chain back cover is in a unfolding state, cross-sectional areas of the plurality of foldable parts of the chain back cover sequentially decrease along a direction from the screen supporting plate to the chain module, so that other parts of the chain back cover may be stored in a part at a lowest side, and the storage and unfolding processes of the plurality of foldable parts of the chain back cover are convenient without problems such as jamming.

Specifically, a material of the chain back cover includes metal.

Regarding the problem of the flexible display screen being curled inside the casing and potentially causing damage due to contact with other components. In some embodiments, as shown in FIG. 3, the display device 1 further includes a circular arc track 17 disposed inside the casing 11. When the flexible display screen 12 is lifted and lowered, the flexible display screen 12 moves along the circular arc track 17. By disposing the circular arc track inside the casing, the flexible display screen moves along the circular arc track when being lifted, so as to prevent the friction damage of the flexible display screen on the casing and the friction damage of the flexible display screen with other components.

Specifically, when the circular arc track is disposed inside the casing, the flexible display screen can keep a certain distance from the casing. When the flexible display screen rotates, the flexible display screen rotates through the circular arc track, thereby preventing the flexible display screen from contacting the casing and other components, and preventing friction damage between the flexible display screen and other components from protecting the flexible display screen.

In some embodiments, as shown in FIG. 3, the display device 1 further includes a side plate 18 fixedly connected to the bracket 15. By disposing the side plate, the side plate may seal an opening of the bracket, so as to prevent components in the bracket and the casing from falling off and throwing out, thereby improving the safety of the display device. Furthermore, the side plate may shield the noise of the components inside the casing during transmission, so as to prevent excessive noise when the display device works.

Specifically, one side plate may be fixed on each of the left and right brackets, and the two side plates are symmetrically arranged.

Specifically, the flexible display screen includes an OLED display panel.

Meanwhile, the embodiment of the present application provides an electronic equipment including the display device as described in any of the embodiments mentioned above.

As can be seen from the embodiments mentioned above:

The present disclosure provides the display device and the electronic equipment. The display device includes the casing, the flexible display screen, the storage component, and the lifting component. The flexible display screen is capable of scrolling inside the casing. The storage component is disposed inside the casing and connected to the end of the flexible display screen for rewinding the flexible display screen. The lifting component is connected to another end of the flexible display screen for lifting and lowering the flexible display screen. The lifting component includes one or more connecting rods, a screen supporting plate, and a chain module. The chain module is connected to the screen supporting plate, the screen supporting plate is connected to the connecting rod, and the screen supporting plate is connected to another end of the flexible display screen. The chain module is used to drive the screen supporting plate to lift and lower, so that the screen supporting plate drives the flexible display screen and the connecting rod to lift and lower. In the present disclosure, the lifting component includes the chain module, the connecting rod, and the screen supporting plate, the end of the flexible display screen is connected to the storage component, another end is connected to the screen supporting plate, and the chain module is connected to the screen supporting plate, so that the chain module may drive the screen supporting plate to lift and lower, thereby driving the flexible display screen to lift and lower without disposing the plurality of motors, reducing complexity and size of the display device, realizing a smaller curling radius, and increasing an application range of the display device. Furthermore, the screen supporting plate drives the connecting rod to lift and lower to prevent the flexible display screen from shifting during a lifting process of the flexible display screen. The connecting rod supports the screen supporting plate to support the flexible display screen, so as to prevent the flexible display screen from bending.

In the foregoing embodiments, the description of each of the embodiments has respective focuses. For a part that is not described in detail in an embodiment, reference may be made to relevant descriptions in other embodiments. Details are not further described herein.

The present disclosure has been described in detail with respect to a display panel, a method for manufacturing the same, and a display device according to an embodiment of the present disclosure. The principles and implementations of the present disclosure are described in detail here with specific examples. The above description of the embodiments is merely intended to help understand the method and core ideas of the present disclosure. At the same time, a person skilled in the art may make changes in the specific embodiments and disclosure scope according to the idea of the present disclosure. In conclusion, the content of the present specification should not be construed as a limitation to the present disclosure.

What is claimed is:

1. A display device having a flexible display screen, comprising:

- a casing;
- the flexible display screen, capable of scrolling inside the casing;
- a storage component, disposed inside the casing and connected to an end of the flexible display screen for rewinding the flexible display screen; and
- a lifting component, connected to another end of the flexible display screen for lifting and lowering the flexible display screen, the lifting component comprising:
  - one or more connecting rods;
  - a screen supporting plate, connected to the connecting rods and another end of the flexible display screen; and
- a chain module, connected to the screen supporting plate and, wherein the chain module is configured to drive the screen supporting plate to lift and lower, so that the screen supporting plate drives the flexible display screen and the connecting rod to lift and lower, and the chain module comprises a driving motor and a chain;
- wherein the chain is connected between the driving motor and the screen supporting plate, and the chain comprises:
  - an inner chain plate;
  - a pin shaft;
  - a roller; and
  - an outer chain plate, fixed with the inner chain plate through the pin shaft at a side of the inner chain plate, and fixed with the inner chain plate through the roller at another side of the inner chain plate;
  - wherein opposite sides of the outer chain plate and the inner chain plate are both provided with a bending part, and a bending direction of the bending part of the outer chain plate is opposite to a bending direction of the bending part of the inner chain plate.

2. The display device having a flexible display screen according to claim 1, wherein the storage component comprises a rotating shaft connected to an end of the flexible display screen and a coil spring fixed on the rotating shaft.

3. The display device having a flexible display screen according to claim 2, wherein the storage component further comprises an adjusting member connected to the coil spring for adjusting an initial pre-tightening force of the coil spring.

4. The display device having a flexible display screen according to claim 2, further comprising a bracket and a bearing, wherein the casing is fixed on the bracket, and the connecting rod is connected to the casing through the bearing.

5. The display device having a flexible display screen according to claim 4, further comprising a side plate fixedly connected to the bracket.

6. The display device having a flexible display screen according to claim 1, further comprises a chain back cover disposed in a lifting area of the chain, wherein the chain back cover is telescopically movable.

7. The display device having a flexible display screen according to claim 1, further comprising a circular arc track disposed inside the casing, wherein in response to the flexible display screen being lifted and lowered, the flexible display screen moves along the circular arc track.

8. The display device having a flexible display screen according to claim 1, wherein the connecting rods are symmetrically disposed on both sides of the casing.

9. An electronic equipment, comprising a display device having a flexible display screen, wherein the display device comprises:

- a casing;
- the flexible display screen, capable of scrolling inside the casing;

a storage component, disposed inside the casing and connected to an end of the flexible display screen for rewinding the flexible display screen; and a lifting component, connected to another end of the flexible display screen for lifting and lowering the flexible display screen, the lifting component comprising:

one or more connecting rods;

a screen supporting plate, connected to the connecting rods and another end of the flexible display screen; and a chain module, connected to the screen supporting plate, wherein the chain module is configured to drive the screen supporting plate to lift and lower, so that the screen supporting plate drives the flexible display screen and the connecting rod to lift and lower, and the chain module comprising a driving motor and a chain;

wherein the chain is connected between the driving motor and the screen supporting plate, and the chain comprises:

an inner chain plate;

a pin shaft;

a roller; and an outer chain plate, fixed with the inner chain plate through the pin shaft at a side of the inner chain plate, and fixed with the inner chain plate through the roller at another side of the inner chain plate;

wherein opposite sides of the outer chain plate and the inner chain plate are both provided with a bending part, and a bending direction of the bending part of the outer chain plate is opposite to a bending direction of the bending part of the inner chain plate.

10. The electronic equipment according to claim 9, wherein the storage component comprises a rotating shaft connected to an end of the flexible display screen and a coil spring fixed on the rotating shaft.

11. The electronic equipment according to claim 10, wherein the storage component further comprises an adjusting member connected to the coil spring for adjusting an initial pre-tightening force of the coil spring.

12. The electronic equipment according to claim 10, further comprising a bracket and a bearing, wherein the casing is fixed on the bracket, and the connecting rod is connected to the casing through the bearing.

13. The electronic equipment according to claim 12, further comprising a side plate fixedly connected to the bracket.

14. The electronic equipment according to claim 9, further comprises a chain back cover disposed in a lifting area of the chain, wherein the chain back cover is telescopically movable.

15. The electronic equipment according to claim 9, further comprising a circular arc track disposed inside the casing, wherein in response to the flexible display screen being lifted and lowered, the flexible display screen moves along the circular arc track.

16. The electronic equipment according to claim 9, wherein the connecting rods are symmetrically disposed on both sides of the casing.

17. The display device having a flexible display screen according to claim 2, wherein a radius of the rotating shaft ranges from 20 mm to 100 mm.

18. The display device having a flexible display screen according to claim 3, further comprising a bracket, wherein the adjusting member is fixed on the bracket with an end of the coil spring.

19. The electronic equipment according to claim 10, wherein a radius of the rotating shaft ranges from 20 mm to 100 mm.

20. The electronic equipment according to claim 11, further comprising a bracket, wherein the adjusting member is fixed on the bracket with an end of the coil spring.

* * * * *